A. B. HUSSEY.
Chimney-Caps.
No. 158,942. Patented Jan. 19, 1875.
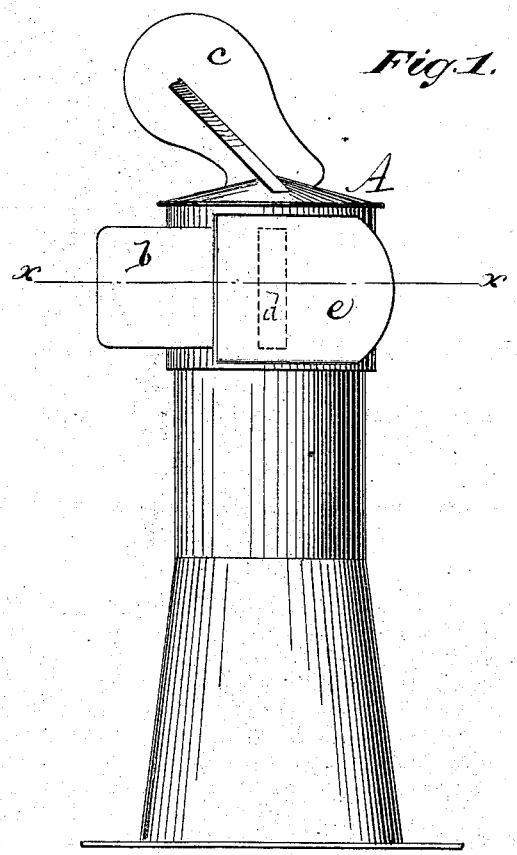
Fig. 1.
Fig. 2.
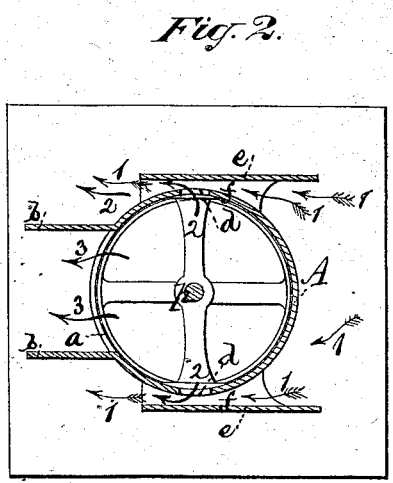
Witnesses
John Becker
Th? Haynes
A. B. Hussey
by his Attorneys
Brown & Allen

UNITED STATES PATENT OFFICE.

ALBERT B. HUSSEY, OF NEW YORK, N. Y.

IMPROVEMENT IN CHIMNEY-CAPS.

Specification forming part of Letters Patent No. 158,942, dated January 19, 1875; application filed December 23, 1874.

*To all whom it may concern:*

Be it known that I, ALBERT B. HUSSEY, of New York, in the county and State of New York, have invented an Improvement in Chimney-Caps; and I do hereby declare that the following is a full, clear, and exact description thereof, reference being had to the accompanying drawing forming part of this specification.

My invention consists, in addition to the ordinary cowl, of a pair of wings, one on each side of the cowl, forming air channels or passages, and openings in the sides of the cowl, communicating with said channels or passages, whereby an upward current is produced, which partially escapes through the side openings, and also increases the outward current through the mouth proper of the cap.

In the accompanying drawing, Figure 1 is a side view of my improved cowl. Fig. 2 is a horizontal section taken in the line $x$ $x$ of Fig. 1.

The cowl A is provided with a mouth, $a$, cheeks $b$, and vane $c$, of the ordinary construction. The cowl is arranged to turn on a pivot, $p$, in the usual manner. In two opposite sides of the cowl are openings $d$. Outside of the cowl and openings are wings $e\ e$, arranged in a direction parallel with the vane, and having their upper and lower edges turned inward toward, and attached to, the cowl, so as to form channels or passages $f\ f$, one on each side of the cowl, parallel with the vane, and communicating with the openings $d\ d$. As the wind blows through the passages $f\ f$, as shown by the arrows 1, it produces in the cowl an upward current, part of which passes out through the openings $d$, as shown by the arrows 2, and the remainder passes out through the mouth $a$, as shown by the arrows 3, increasing the outward current through said mouth, and giving a better draft to the chimney to which the cowl is attached.

What I claim as new, and desire to secure by Letters Patent, is—

The combination, with the revolving vertical chimney-cap A, provided with the open mouth $a$ and the side openings, $d\ d$, of the wings $e\ e$, attached at their upper and lower ends to the cap to create the air-channels $f\ f$, which communicate with the side openings, $d$, for producing an upward current, which partially escapes through the side openings, and increases the outward current through the mouth of the cap, substantially as described.

ALBERT B. HUSSEY.

Witnesses:
   BENJAMIN W. HOFFMAN,
   MICHAEL RYAN.